US005136161A

United States Patent [19]

Logan

[11] Patent Number: 5,136,161

[45] Date of Patent: Aug. 4, 1992

[54] RF MASS SPECTROMETER

[75] Inventor: Charles H. Logan, Botheil, Wash.

[73] Assignee: SpaceLabs, Inc., Redmond, Wash.

[21] Appl. No.: 628,173

[22] Filed: Dec. 3, 1990

[51] Int. Cl.[5] .......... B01D 55/44; H01J 49/00

[52] U.S. Cl. .......... 250/293; 250/281

[58] Field of Search .......... 250/281, 283, 292, 293, 250/287

[56] References Cited

U.S. PATENT DOCUMENTS

| | | | |
|---|---|---|---|
| 2,896,083 | 7/1959 | Hare et al. | 250/293 |
| 4,850,371 | 7/1989 | Broadhurst et al. | 128/719 |
| 4,966,141 | 10/1990 | Bacaner et al. | 128/207.14 |
| 5,043,576 | 8/1991 | Broadhurst et al. | 250/293 |

OTHER PUBLICATIONS

W. H. Bennett "Radiofrequency Mass Spectrometer" Journal of Applied Physics, 21:143–149, 1950.

P. A. Redhead "A Linear Radio-Frequency Mass Spectrometer" Canadian Journal of Physics, 30:1–13, 1952.

R. L. F. Boyd and D. Morris "A Radio-Frequency Probe for Mass-Spectrometric Analysis of Ion Concentrations" Proc. Phys. Soc. 68:1–10, 1955.

*Primary Examiner*—Bruce C. Anderson
*Attorney, Agent, or Firm*—Seed and Berry

[57] ABSTRACT

A mass spectrometer includes an ion source for ionizing a sample substance to provide an ion current of predetermined beam width and energy. A mass filter includes a plurality of drift tubes wherein succeeding drift tubes are of increasing length separated by gaps that increase in length. The ion current is supplied to the mass filter along with an alternating current electrical signal in a manner so that particles having a predetermined mass receive a predetermined maximum energy increase while traversing the mass filter and so that particles not having the predetermined mass do not receive the maximum energy increase. A detector is provided to create an energy barrier whereby only particles that receive the maximum energy increase will have sufficient to completely traverse the barrier. Particles which traverse the barrier are detected thereby to determine the amount of particles having a predetermined mass that were contained in the sample substance.

25 Claims, 3 Drawing Sheets

FIG. 1
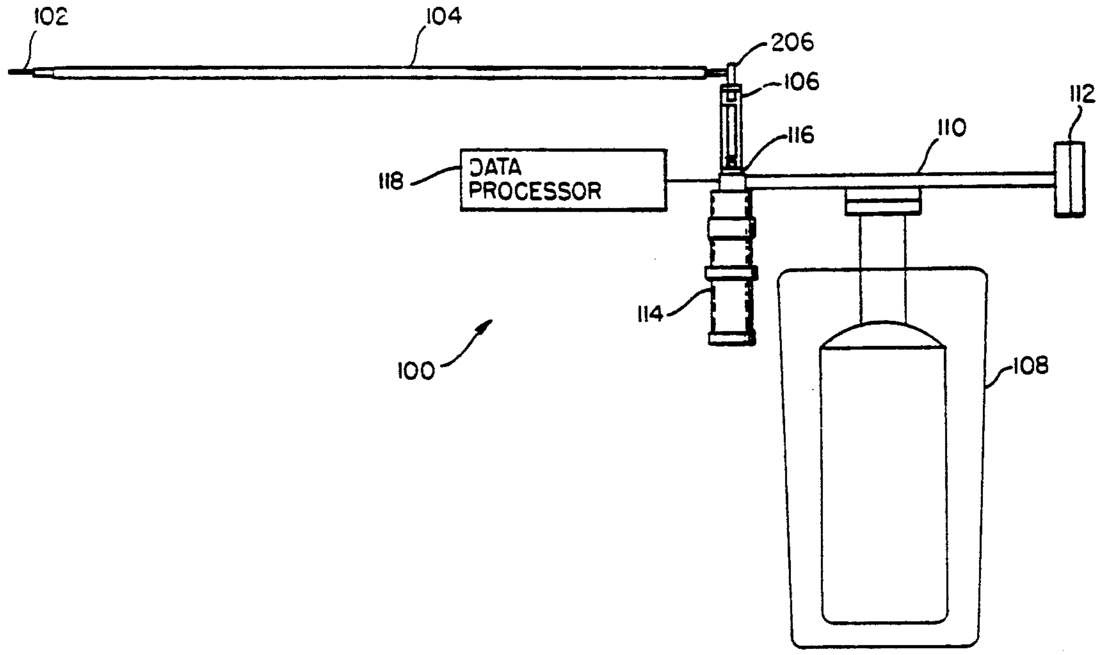
FIG. 2
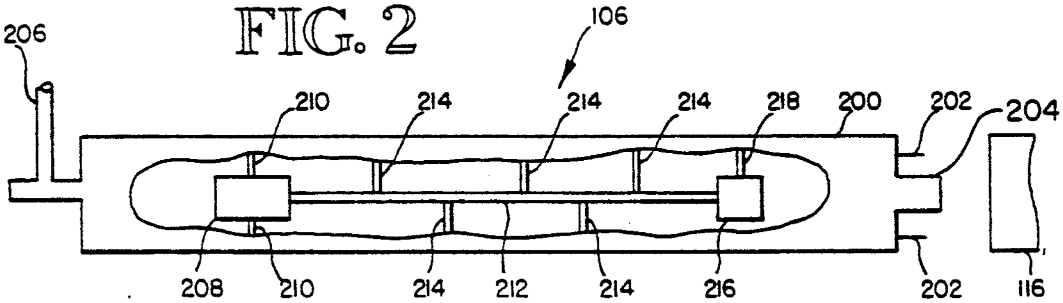
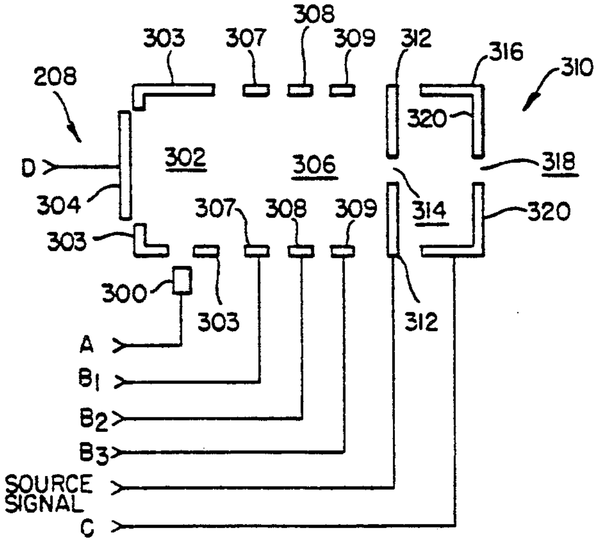
FIG. 3
FIG. 5
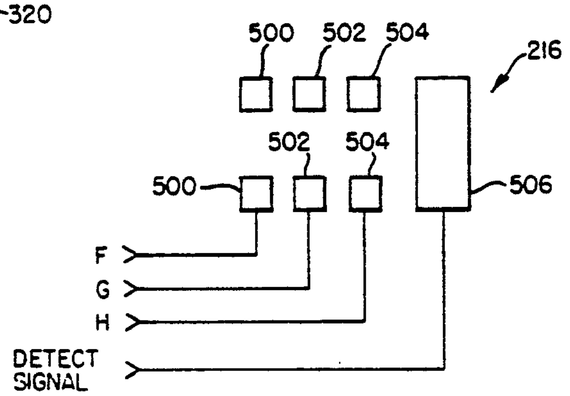

RF MASS SPECTROMETER

TECHNICAL FIELD

The present invention is directed in general towar mass spectrometry and, more particularly, toward method and apparatus for determining the relative quantities of particles in a substance.

BACKGROUND OF THE INVENTION

Mass spectrometry is the science of identifying the relative quantities of particles in a sample substance. Instruments for performing this analysis include mass spectrometers. Several types of mass spectrometers are presently in the prior art. Of these, the magnetic field mass spectrometer is the most popular.

The magnetic field mass spectrometer uses an ion source for providing an ion current comprising ionized particles of the sample substance. The ion current travels along a linear path into a magnetic field. The resulting electromagnetic force between the charged ionized particles and the electromagnetic field alters the linear path of the ionized particles, causing the ionized particles to travel arcuately through the magnetic field. The degree of arc through which the ionized particles travel is a function of the mass of each individual ionized particle, the velocity of each individual ionized particle, and the strength of the magnetic field. After traversing the magnetic field, the ionized particles resume traveling along a linear path. However, due to the arcuate displacement caused by the magnetic field, the linear path traveled by the ionized particles after traversing the magnetic field is angularly displaced from the linear path traveled by the ionized prior to entering the magnetic field. The degree of angular displacement of the linear path is a function of the degree of arcuate travel which is in turn a function of the mass and velocity of the individual ionized particle. The mass of the individual particles can thus be determined by determining the amount of the angular displacement.

To measure this displacement, the magnetic mass spectrometer includes a detecto. A common detector for the magnetic mass spectrometer comprises a photographic plate, with an emulsive coating. The photographic plate is positioned in the linear path of the ionized particles exiting the magnetic field. The ionized particles strike the photographic plate and activate the emulsion thereof. The photographic plate is thereafter develope to reveal a line for each mass of particle present in the sample substance. The relative density of the lines represents the relative quantities of the individual ionized particles in the sample substance. Alternatively, electrical means can be used to detect the angular displacement. A dynode of Faraday cup, can be used in plurality, or in combination with a moving slit, to detect the population of ionized particles at each angular displacement.

The popular magnetic mass spectrometers suffer from several known disadvantages. Primarily, these mass spectrometers use mechanisms for creating magnetic fields that are typically bulky and expensive to manufacture. Accordingly, such magnetic mass spectrometers are often large and expensive. Further, since magnetic mass spectrometers rely upon measuring angular displacement of the linear path of ionized particles, electronic detection used in conjunction with the magnetic mass spectrometer requires either plural detectors or moving parts to measure the physical displacement of the linear path of the ionized particles. These plural detectors, or moving parts, are also bulky and expensive ot manufacture. Accordingly, conventional magnetic mass spectrometers are not pratical for applications requiring small spectrometers at inexpensive production prices.

Other mass spectrometers which do not rely upon magnetic fields are referred to as radio frequency (RF) mass spectrometers. One type of RF mass spectrometer relies upon a four-pole structure wherein four conductive rods are positioned parallel to one another and spaced therefrom in a rectangular arrangement. The conductive rods are energized with an electrical signal that includes an alternating current (AC) component and a direct current (DC) component, thereby to create an electric field between the rods having respective AC and DC components. An ion current comprising ionized particles of the sample substance is provided from an ion source in the same manner as the ion current is provided in the magnetic mass spectrometer. The ion current from the ion source travels through the four-pole structure toward a detector. The frequency of the alternating current component of the electrical signal, and the magnitude of the direct current component of the electrical signal, are selected so that only ionized particles of a selected mass are permitted to completely traverse the four-pole structure. Ionized particles having a mass that is greater than the selected mass are attracted by the direct current component of the electric field so tht they collide with one of the conducting rods and do not traverse the four-pole structure. Ionized particles having a mass that is less than the selected mass are attracted to the conductive rods by the alternating current component of the electrical field and are also prevented from completely traversing the four-pole structure. The quantity of ionized particles exiting the four-pole structure is detected to determine the quantity of that ionized particle in the substance. Detection in this arrangement can be by means of a photographic plate, a single dynode, or a single Faraday cup.

The four-pole RF mass spectrometer also suffers from several known disadvantages. In the four-pole mass spectrometer, the length and spacing of the conductive rods is extremely critical to the operating tolerances of the resulting device. Accordingly, four-pole mass spectrometers are difficult and expensive to build. Further, these mass spectrometers are difficult to produce in large quantities and difficult to produce in smaller sizes. Still further, four-pole mass spectrometers do not provide good resolution for measuring particles having small mass. Accordingly, four-pole mass spectrometers are not acceptable for high-volume production of small mass spectrometers at inexpensive prices.

Another type of RF mass spectrometer that has been described in the literature relies upon linear acceleration to identify particles of selected masses. Unlike the nagnetic spectrometer and the four-pole mass spectrometer, these spectrometers require an ion source that provides an ion current at an extremely high velocity. The linear accelerator RF mass spectrometer includes an ion source similar to that of the magnetic mass spectrometer and the four-pole RF mass spectrometer. In addition, a D.C. accelerator is provided to receive the ion current exiting the ion source and to accelerate the ionized particles thereof to an extremely high velocity. The energy added by the D. C. accelerator is selected to be great enough so that the final velocity if the ionized particles is dependent almost entirely upon the ratio of the energy added by the D.C. accelerator to their mas, and not dependent on their initial velocity. Since all ionized particles have been elevated to the same energy level, the velocity of an individual ionized particle is a function of the mass of the ionized particle.

A series of equally-spaced drift tubes arranged in the form of a linear accelertor are positioned to receive the accelerated ionized particles. These drift tubes are each electrically conductive and include an interior channel the defines a path of travel for the ion current. Each drift tube is of equal length and is separated from its adjoining drift tube by an equal spacing referred to as a gap. An alternating current electrical signal is provided to the series of drift tubes to energize the drift tubes and create an electrical field in the gap intermediate successive drift tubes. Since the magnitude of the electrical signal is varying, the magnitude of the electric field created in the gap between adjacent drift tubes also varies. The frequency of the electrical signal so that portion of the ionized particles having the desired mass, and therefore a known velocity determined by their mass and energy level, will reach the gap between adjacent drift tubes when the magnitude of the electric field is at its maximum value. These ionized particles are referred to as synchronous particles. The magnitude of the electrical signal provided to the series of drift tubes, and similarly the magnitude of the electric field create within the gap, is selected so that the energy increase to any particle by successive exposure to the electric field is negligible. Conversely, ionized particles having a mass that is greater than, or less than, the desired mass will not enter successive gaps at the same time during each occurrence of the electrical field. Accordingly, these particles will be exposed to electric fields of various smaller levels, including retarding fields, i.e., an electric field that applies a force to the particle opposite to its direction of travel. The net result of the expsoure to electric fields of varying magnitude is to substantially decelerate ionized particles having a mass that is greater than, or less than, the selected mass. The quantity of particles of the desired mass is measured by detecting the quantity of ionized particles that maintain the initial high energy through the series of drift tubes. The detectors used by this drift tube mass spectrometer include an energy barrier having an energy level that is selected so that only the high energy particle is permitted to traverse the barrier. Accordingly, ionized particles that have a mass that is greater than, or less than, the selected mass, will decelerte when traversing the series of drift tubes and will not exit the drift tubes with sufficient energy to traverse the energy barrier. These particles will not be detected by the detector.

The linear accelerator RF mass spectrometer relies upon two critical assumptions, namely, that the velocity of the ionized particles exiting the accelertor is independent of their velocity entering the accelertor and, that negligible energy is added to the synchronous particles while traversing the series of drift tubes. Accordingly, the description of the linear accelerator RF mass spectrometer may not describe practical apparatus for high-volume production of an inexpensive mass spectrometer.

It is desirable, therefore, to provide an improved mass spectrometer tht is inexpensive to produce and which can be manufactured in volume. It is also desirable to provide an inexpensive mass spectrometer that can be produced in small sizes. It is further desirable to provide an improved method for mass spectrometry, which method can be performed inexpensively.

SUMMARY OF THE INVENTION

A radio frequency mass spectrometer is provided for determining the quantity of a particular molecule in a sample substance wherein ionized particles of the participlar molecule have a predetermined molecular mass. The mass spectrometer includes an ion source for receiving the sample substance and for ionizing molecules of the sample substance and providing an ion current of the ionized molecules of the substance as the ion source output. The ion source is further adapted to provide a source signal indicative of the magnitude of the ion current. The mass spectrometer also includes a mass filter for selectively increasing the energy level of the ionized molecules of the ion current to provide a maximum energy level to selected ionized molecules having the predetermined molecular mass. A detector is provided for decelerating the ionized molecules of th eion current after the selective acceleration thereof to determine a quantity of the selected ionized molecules that have received the predetermined maximum energy level. The detector is further adapted to provide a detect signal that is indictive of the quantity of the selected ionized molecules detected. A data processor is provided with the mass spectrometer for controlling the operation of the ion source, the mass filter, and the detector. The data processor is responsive to the source signal and the detect signal to determine the quantity of the particular molecules in the substance being evaluated.

The mass spectrometer also includes novel apparatus for providing the necessary vacuum for the mass spectrometer. The mass spectrometer includes a housing for providing vacuum isolation of the ion source, the mass filter, and the detector from the ambient environment. The housing includes apparatus for transmitting and receiving electrical signals to and from the data processor. The housing further includes apparatus for receiving the sample substance. A sorption pump is coupled to the housing for absorbing gas molecules in the housing to create a partical vacuum. An ion pump is also coupled to the housing for ionizing gas molecules and for conducting the ionized gas molecules away from the housing, thereby acting as a pump to extract molecules from the housing and increasing the partical vacuum created by the sorption pump.

BRIEF DECRIPTION OF THE DRAWINGS

FIG. 1 is an illustrative diagram of the RF mass spectrometer that is the subject of this invention.

FIG. 2 is more detailed illustration of the apparatus for performing mass spectrometry in accordance with the subject invention.

FIG. 3 is an illustrative electrical diagram of the ion source used in the mass spectrometer of the subject invention.

FIG. 5 is an illustrative electrical diagram of the detector used in the mass spectrometer of the subject invention.

DETAILED DESCRIPTION OF THE INVENTION

Figure 4:
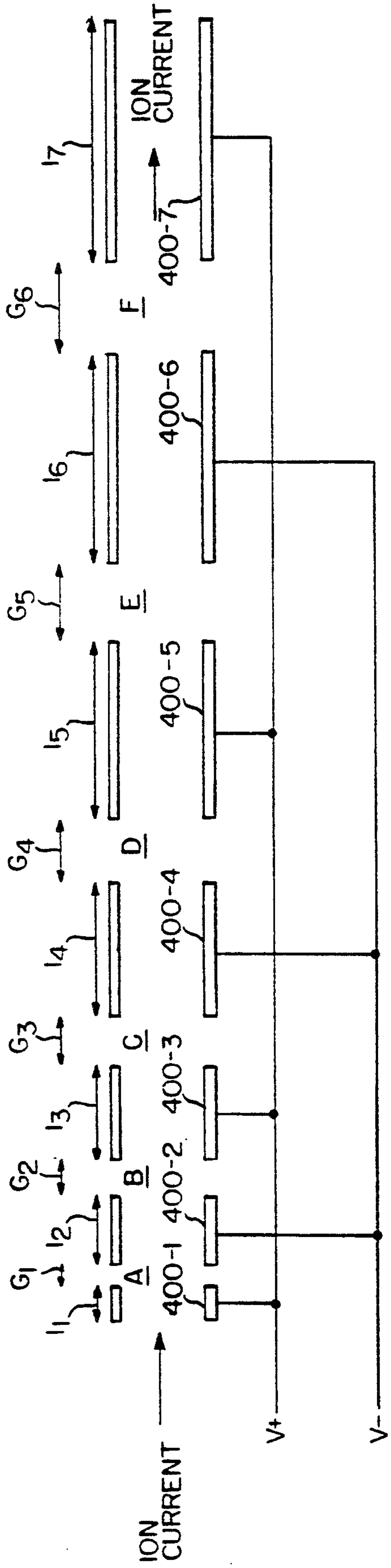
FIG. 4 is a detailed illustration of the mass filter used in the mass spectrometer of the subject invention.

An improved radio frequency (RF) mass spectrometer 100 is illustrated in FIG. 1. The RF mass spectrometer 100 includes a gas inlet 102 that is coupled to a flexible tubing 104 for conducting the gas to be sampled, referred to herein as the sample substance, from the environment to a housing 106 of the mass spectrometer 100. The gas inlet 102 may comprise fused silica capillary tubing having a small diameter, approximately 2 microns, for limiting the amount of sample gas to be provided to the mass spectrometer 100. Silica capillaries of this type are readily available from several commercial sources.

The flexible tubing 104 may comprise anu apparatus for coupling the gas inlet 102 to the housing 106. In the presently preferred embodiment of the invnetion, the gas inlet 102 is adapted to be coupled to an air-way sensor for use in the air passageway of a human patient. The flexible tubing 104 is provided so that the housing 106, and other components of the mass spectrometer, may be physically separated from the gas inlet 102. However, if such physical separation is not necessary, the tubing 104 may be eliminated.

The mass spectrometer 100 further includes a sorption pump 108 that is coupled to a conduction pipe 110 for fluid communication with the conduction pipe 110. The conduction pipe 110 is coupled to an electromechanical coupling 116 for cinducting fluid from the housing 106 to the conductive pipe 110 thereby to provide a fluid path from the housing 106 to the sorption pump 108. The conduction pipe 110 may comprise any suitable material for conducting gas from the electromechanical coupling 116 to the sorption pump 108. A back-to-air valve 112 is couple to the end of the conduction pipe 110 so that the air pressure within the housing 106 may be returned to that of the ambient environment by operation of the user.

The sorption pump 108 is provided for absorbing gas molecules in the housing 106 to create a partial vacuum therein. For this purpose, the sorption pump includes an extremely porous substance such as, for example, zeolite, that absorbs gas molecules. This extremely porous substance acts as a molecular sieve to absorb molecules from the housing 106 to thereby create the partial vacuum. Configured in this manner, the sorption pump 108 is capable of attaining a vacuum in the housing 106 of approximately $10^{-3}$ torr. The sorption pump 108 may be reused by periodically heating the porous substance to drive off the absorbed molecules via the back-to-air valve 112, thereby to replenish the capacity of the porous substance of the sorption pump 180. Sorption pumps that are acceptable for use with the apparatus of the subject invention are readily available from several commerical sources including Varian Associates.

The electromechanical coupling 116 is further coupled to an ion pump 114. The ion pump 114 acts in combination with the sorption pump 108 to inncrease the vacuum within the housing 106 to a vacuum of approximately $10^{-5}$ torr. The ion pump 114 inlcudes an ion chamber (not shown) wherein gas nolecules conducted to the ion pummp 114 from the housing 106 are ionized. The ion pump 114 creates a magnetic field that causes the ionized gas molecules within the ion chamber to impact the walls of the chamber, creating a localized drop in gas pressure so that more gas molecules will be conducted to the ion chamber. In this manner, the required vacuum is created within the housing 106. Ion pumps acceptable for use with the apparatus and method of the subject invention are available from several known commercial sources including Kernco, Inc.

The electromechanical coupling 116 is adapted to provide fluid communication between the housing 106, the sorption pump 108, the conduction pipe 110 and the ion source 114 so that the appropriate vacuum may be created within the housing 106. Further, the coupling 116 is provided for coupling data processing apparatus to the housing 106 so that bi-directional electrical signal communication may be established therebetween. The electromechanical coupling 116 may comprise any device for mechanically coupling the housing 106 to the conduction pipe 110 to provided a fluid path therebetween. Additionally, the electromechanical coupling 116 includes apparatus for mechanically coupling the housing 106 to the ion pump 114 to provide a fluid path therebetween . Still further, the electromechanical coupling 116 includes apparatus for electrically coupling the housing 106 to a data processor 118, as will be discussed in more detail below. The electromechanical coupling 116 may be readily provided by those skilled in the art.

With reference to FIG. 2, a more detailed, illustrative diagram of the housing 106 and the apparatus for performing the mass spectrometry is provided. The housing 106 comprises a cylindrical glass housing 200 that includes electrical feed-throughs 202 and a vacuum feed-through 204, each adapted to mate with the electromechanical coupling 116. Although the housing 200 is described herein as a cylindrical glass housing, the housing may comprise any of a variety of shapes and materials for supporting the vacuum required by the mass spectrometer of the subject invention. Further, in alternative applications it may be desirable to provide a housing 200 that is substantially impervious to electrical and/or magnetic fields. However, unless the mass spectrometer 100 is operated in close proximity with large magnetic and/or electric fields, the cost of providing such as housing 200 far outweighs any benefit therefrom.

The housing 200 includes an elbow tube 206 adapted to couple with the flexible tubing 104. The elbow tube 206 provides the means by which the substance to be sampled is conducted to the interior of the housing 200 from the flexible tubing 104. Appropriate apparatus for the elbow tubing 206 may be readily provided by those skilled in the art.

The housing 200 is provided for supporting therein apparatus for performing the mass spectrometry measurement in accordance with the method of the subject invention. An ion source 208 is fixedly supported and positioned within the housing 200 by a plurality of radial support members 210. The radial support members 210 may comprise a material similar to that of the housing 200 or, alternatively, any suitable material for fixedly supporting and positioning the ion source 208.

The ion source is constructed for ionizing molecules of the sample substance to provide ionized molecules, referred to herein as ionized particles. The ion source is further adapted to provide a source signal, which is an electrical signal indicative of the magnitude of the ion current output. The source signal is provided to the data processor 118 via the electrical feed-throughs 202, as will be discussed in more detail below.

The ion current from the ion source 208 is provided to a mass filter 212 that is also supported within the housing 200 via a plurality of radial support members 214. Like the radial support members 210, the radial support members 214 may comprise any support structure for fixedly supporting and positioning the mass filter within the housing 200. In the presently preferred embodiment of the invention, the radial support members 214 comprise a plurality of tubular glass members, spaced radially about the mass filter 212, for supporting the mass filter 212.

The mass filter 212 is provided for selectively increasing the energy level of the ionized particles of the ion current provided by the ion source 208. The energy level of the ionized particles of the ion current is increased in a manner so that a predetermined maximum energy level is provided to selected ionized particles having a predetermined molecular mass. These selected ionized particles that receive the maximum energy level in the mass filter 212 are referred to herein as the synchronous particles. Accordingly, only those ionized particles having the predetermined molecular mass, i.e., the synchronous particles, will exit the mass filter 212 with the predetermined maximum energy level. Other ionized particles, having either a greater or lesser molecular mass, will not attain the predetermined maximum energy level upon exiting the mass filter 212 and will thus exit the mass filter 212 with an energy level less than the predetermined maximum energy level.

The ion current exiting the mass filter 212 is conducted to a detector 216 that is also fixedly supported and positioned within the glass housing 200 via a plurality of radial support members 218. Like the support members 210 and 214, the radial support members 218 comprise any apparatus for fixedly supporting and positioning the detector 216 within the cylindrical glass tubing 200. In the presently preferred embodiment of the invention, the radial support members 218 comprise tubular glass members spaced radially about the detector 216.

The detector 216 is provided for decelerating the ionized particles of the ion current after the selected acceleration thereof to determine the quantity of synchronous particles that attained the predetermined maximum energy level. To this end, the detector 216 provides an energy barrier that must be traversed by the ion current. The detector 216 includes a transducer (not shown) positioned after the energy barrier for detecting the population of ionized particles that traverse the barrier. The energy level of the energy barrier is selected so that those ionized particles not receiving the predetermined maximum energy level are without sufficient energy to fully traverse the barrier and are therefore not detected by the transducer element of the detector 216. Only those ionized particles which do attain the predetermined maximum energy level have sufficient energy to fully traverse the energy barrier and are detected by the transducer of the detector 216. The transducer of the detector 216 is adapted to provide a detect signal, which detect signal in an electrical indicative of the quantity of the ionized particle detected. The detect signal is provided to the data processor 118 from the detector 216 via the electrical feed-throughs 202, as will be discussed in more detail below.

With reference to FIG. 3, a more detailed illustrative diagram of the ion source 208 is provided. The ion source 208 includes a filament 300 for producing low-energy electrons to be injected into an ionization chamber 302 of the ion source 208. The ionization chamber 302 is defined by the contour of an electrode 303 that is unbiased. The ionization chamber 302 is provided for receiving molecules of the sample substance and for ionizing the molecules thereof to provide the ionized particles. In the ionizaton chamber 302 the low-velocity electrons from the electron source 300 will collide with molecules of the substance to be evaluated, thereby causing electrons to be removed from the molecules of the substances to be evaluated to create ionized particles thereof. As is known in the art, other devices can be readily substituted for the filament 208 to provide the low-energy electrons to the ionization chamber 302.

A backplate 304 is energized by a direct current electrical signal D received from the data processor 118 via the electromechanical coupling 116 and the electrical feed-throughs 202. The backplate 304 is energized to create an electric field to repel the ionized particles away from the backplate 304, toward an exit end 310 of the ion source 208. The ionized particles therefore travel out of the ionization chamber 302 and into an acceleration chamber 306 defined by several electrodes 307, 308, and 309.

The electrodes 307, 308, and 309 are each electrically conductive cylindrical electrodes having an interior channel. Each electrode is separated from its adjoining electrode by a small gap to create a field region between adjoining electrodes. Each of the several electrodes 307, 308, and 309 is energized by a respective direct current electrical signal $B_1$, $B_2$, and $B_3$ to create an electric field within the field's regions. The magnitude of the electric signals $B_1$, $B_2$, and $B_3$ is selected to provide electric fields of specific polarity and specific magnitude within each field region so that the ionized particles of the ion current are accelerated within the ionization chamber 306 toward the exit end 310. The electric signals $B_1$, $B_2$ and $B_3$ are provided to the ion source 208 from the data processor 118 via the electrical feed-throughs 202. In alternative embodiments, more electrodes defining a greater number of field regions may be provided for more gradual acceleration of the ionized particles. The magnitude of the electrode signals, as well as the dimensions of the several electrodes 307, 308, and 309, may be readily selected by those skilled in the art to provide the appropriate acceleration to the ionized particles.

A sensing electrode 312 is positioned proximate the chamber 306 and substantially electrically isolated therefrom. The sensing electrode 312 may comprise a disk-like member having a substantially circular through-hole that defines an ion path 314. The diameter of the circular through-hole within the electrode 312 is selected so that a predetermined portion of the ion current will collide with the electrode 312. The electrode 312 is responsive to the intercepted portion of the ion current to provide the source signal as the output of the ion source 208. As discussed above, the source signal is indicative of the magnitude of the ion current. Detailed specifications of the construction of the electrode pair 312 may be readily provided by those skilled in the art, when the beam diameter of the ion current and the minimum magnitude for the source signal are also specified.

A focusing electrode 316 is positioned adjacent the sensing electrode 312 in the path of the ion current exiting the sensing electrode. The focusing electrode 316 is responsive to an electrode signal C, which electrode signal is provided to the focusing electrode 316 from the data processor 118 via the electrical feed-throughs 202. The electrode signal C, like the electrode signals $B_1$, $B_2$, and $B_3$, may comprise a substantially direct current voltage signal for creating an electric field within a focusing chamber 318 defined by the focusing electrode 316. The focusing electrode 316 may comprise a disk-like interior portion 320 that extends inward of the focusing chamber 318. The focusing electrode 316 and the disk-like portions 320 thereof create an electric field that focuses the ionized particles of the sample substance so that the ion current created thereby will have a predetermined beam diameter. The dimensions of the focusing electrode 316 and the magnitude of the electrode signal C may be readily selected by one skilled in the art. Also, a series of focusing electrodes may be provided to further improve the beam diameter of the ion current exiting the ion source 208.

The dimensions of the ionization chamber 302. the acceleration chamber 306, and the focusing chamber 318 are each selected, in combination with the electrical signals A, $B_1$, $B_2$, $B_3$and C to provide an ion current having predetermined electrical parameters. Of primary importance is providing a predetermined quantity of ion current having a specified energy level, beam diameter and dispersion. The amount of current is primarily controlled by the number and velocity of electrons provided by the electron source 300 in combination with the amount of sample substance permitted by the gas inlet 102. The construction of the electrodes 307, 308, and 309, in combination with the electric fields created therein, further determine the amount of ion current provided by the ion source 208 and the velocity of the electrons exiting the ion source 208. Preferably, all of the ionized particles exiting the ion source will have a relatively low energy level of approximately 200 electron volts. The ion source may be constructed by several commercial companies to meet predetermined characteristics, for example: ionized particle velocity; magnitude of ion current; beam diameter and dispersion; and ratio of magnitude of ion current to magnitude of source signal. One suitable manufacturer for the ion source 208 is Leybold Inficon. Other manufacturers are available.

With reference to FIG. 4, a more detailed illustration of the mass filter 212 is provided. The mass filter 212 includes a plurality of drift tubes 400-1 through 400-7. Each drift tube 400-1 through 400-7 comprises a tubular element having a channel therethrough. Further, each of the plurality of drift tubes 400-1 through 400-7 include a longitudinal axis wherein the plurality of longitudinal axes are aligned to define a path for the ion current. Further, each of the plurality of drift tubes 400-1 through 400-7 has a predetermined channel length $1_1$ through $1_7$, respectively. The plurality of drift tubes 400-1 through 400-7 are arranged along the ion current path in order of increasing length $1_1$ through $1_7$. Each drift tube comprises an electrically conductive shell coupled to receive an electrical signal V from the data processor 118 via the electrical feed-throughs 202. The electrical signal V is an alternating current electrical signal having a predetermined magnitude and a fixed frequency. The electrical signal V is coupled to the plurality of drift tubes so that opposite polarities of the electrical signal are provided to alternating ones of the plurality of drift tubes along the ion current path. More particularly, the positive terminal of the alternating current electrical signal is provided to drift tubes 400-1, 400-3, 400-5, and 400-6 while the negative terminal of the electrical signal is provided to drift tubes 400-2, 400-4, and 400-6.

The plurality of drift tubes 400-1 through 400-7 are spaced one from another by an increasing amount along the ion current path by a predetermined distance $f_1$ through $g_6$ to define a plurality of field regions A–F between adjacent drift tubes. The alternating current electric signal provided to the drift tubes 400-1 through 400-7 provides an electric field within the field regions between adjacent drift tubes. Since the electric signals supplied to adjacent drift tubes are opposite in polarity, it will be apparent to those skilled in the art that the electrical field provided to adjacent field regions will be substantially equal in magnitude and opposite in polarity. For example, if an electric field of magnitude +i is provided to field regions A, C. and E, then an electric field of magnitude -i will be provided to field regions B, D, and F. It will be further apparent to those skilled in the art that since each of the plurality of drift tubes 400-1 through 400-7 are electrically conductive, then substantially no electric field will be provided within the channels of the plurality of drift tubes.

In operation, as the plurality of ionized particles traverse the ion current path defined by the plurality of drift tubes 400-1 through 400-7, a selected portion of the ionized particles will reach the first field region A at the same time that the field generated therein reaches its maximum value. These particles will receive an energy increase, and corresponding increase in velocity, that is greater than that received by ionized particles reaching the first field region A at a time when the electric field is at a magnitude less that its maximum value. Since the increase the velocity is dependent upon the mass of the ionized particle and the amount of energy added to the ionized particle, and since the mass of the synchronous particle is knowm, the increase in velocity for the synchronous particle is determinable.

The length of the succeding drift tube 400-2 is selected so that the synchronous particle that received the maximum energy increase, and known velocity increase, from the first field region A will reach the second field region B at the same time that the electric field created therein reaches its maximum value. Again these synchronous particles will receive the maximum energy increase from the electric field to thereby increase the velocity of the synchronous particle by a predetermined amount. Other ionized particles that reached the first field region A when the electric field was at its maximum value will have a velocity increase that is either greater than that received by the synchronous particle (if the mass of the other ionized particle is less than the mass of the synchronous particle) or less than that received by the synchronous particle (if the mass of the other ionized particle is greater than the mass of the synchronous particle). Accordingly, the other ionized particles that received the maximum energy increase while traversing the first field region A, will reach the second field region B either before, or after, the electric field reaches its maximum value and will receive an energy increase less than the maximum received by the synchronous particle.

The length of the succeding drift tube 400-3 will be selected so that the synchronous particle will traverse this drift tube and reach the succeeding field region C at the same time that the electric field created therein reaches its maximum value. The succeeding lengths of the drift tubes will be selected so that the synchronous particle, receiving maximum energy increase, continues to reach the successive field regions during times of maximum electric field. It will be readily energy increases, the synchronous particles will exit the mass filter 212 with the predetermined maximum energy increase. Further, the energy of the other ionized particles will be substantially less than the energy of the synchronous particle since the other ionized particles will receive an increase in energy less than the maximum while traversing a majority of the field regions.

It will also be apparent to those skilled in the art that since the velocity of the synchronous particle is increased in each field region, and since the frequency of the electrical signal V is fixed, the lengths $l_1$ through $l_7$ of successive drift tubes must increase. The lengths $l_1$ threough $l_7$ of the plurality of drift tubes and the gaps $g_1$ through $g_6$ may be determined by one skilled in the art after selection of the magnitude of the electrical signal V and energy level of the ionized particles exiting the ion source 208.

Althouth the above description is phrased in terms of selecting the appropriate size for the plurality of drift tubes 400-1 through 400-7, those skilled in the art will appreciate that once the lengths of the drift tubes 400-1 through 400-7 have been determined for a synchronous particle of predetermined mass, it would be advantageous to select a different mass for the synchronous particle without the need to alter the length of the plurality of drift tubes 400-1 through 400-7. It has been predetermined, that once the size for the drift tubes has been selected, the mass of the synchronous particle can be altered by altering the frequency of the electrical signal provided to the plurality of drift tubes 400-1 through 400-7. Accordingly, once selected, the lengths of the drift tubes need not be changed. Instead, the frequency of the electrical signal V can be changed so that ionized particles of varying mass can be identified as synchronous particles.

The plurality of drift tubes may be supported in a cylindrical tubing as illustrated in FIG. 2 or, alternatively, may each be individually supported within the glass housing 200.

Figure 4A:
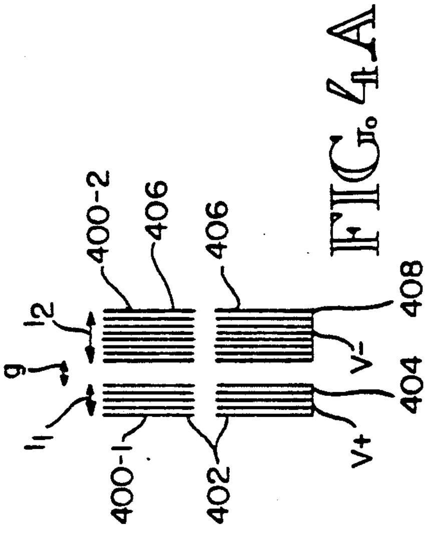
FIG. 4A is an illustrative diagram of an alternative embodiment for drift tubes for use with the mass filter illustrated in FIG. 4.

As mentioned above, each of the plurality of drift tubes 400-1 through 400-7 comprises a substantially circular cylinder that is hollow in configuration. As an alternative embodiment, the plurality of drift tubes 400-1 through 400-7 may be provided as a plurality of spaced wafers as indicated in FIG. 4A. Therein, drift tube 400-1 comprises a plurality of spaced wafers 402 each electrically connected via an electrical coupling 404 to the positive terminal of the electrical signal. Similarly, the drift tube 400-2 comprises a plurality of spaced wafers 406 electrically connected to the negative terminal of the electrical signal via an electrical connection 408. The length of the drift tubes 400-1 and 400-2 is determined by the number of the plurality of spaced wafers provided for each dirft tube. Accordingly, to provide a longer dirft tube, a greater plurality of spaced wafers is provided. Each of the spaced wafers comprises a substantially disk-like member having a through-hole. Each wafer is of equal thickness and the plurality of wafers are equally spaced one from another. This alternative method of providing the drift tubes is commonly used in apparatus such as electron guns.

With reference to FIG. 5, a more detailed illustrative block diagram of the detector 216 is provided. The detector 216 comprises a series of electrodes 500-504 each being energized by a respective direct current electrode signal F, G, and H to provide an electric field intermediate adjacent electrodes. Each electrode 500-504 comprises a substantially circular electrode having an interior chamber that defines the ion current path. The plurality of electrodes 500-504 are energized with sufficient electrical energy to provide an electric field. The electric field comprises an energy barrier wherein the ionized particles of the ion current are decelerated. The magnitude of the electrode signals F, G, and H is selected to provide an energy barrier of sufficient magnitude so that only the synchronous particle that received the maximum energy increase in the mass filter will have sufficient energy to traverse the barrier.

The detector 216 further includes a transducer 506 that is responsive to ionized particles from the ion current to provide the detect signal. As mentioned above, the detect signal is indicative of the amount of current striking the transducer 506. Since only the synchronous particles have sufficient energy to traverse the energy barrier created by the electodes 500-504, the detect signal is indicative of the population of synchronous particles in the ion current. The transducer 506 may comprise a Faraday cup as is known in the art. Alternatively, the transducer may comprise a dynode, or other apparatus suitable for providing the detect signal in response to the synchronous particles.

Like the ion source, the detector 216 may be constructed by several commercial companies to meet predetermined characteristics such as the energy and uniformity of the energy barrier as well as the level of desired output current for the detect signal. One suitable manufacturer for the detector 216 is Leybold Inficon. Other manufacturers are available.

Figure 6:
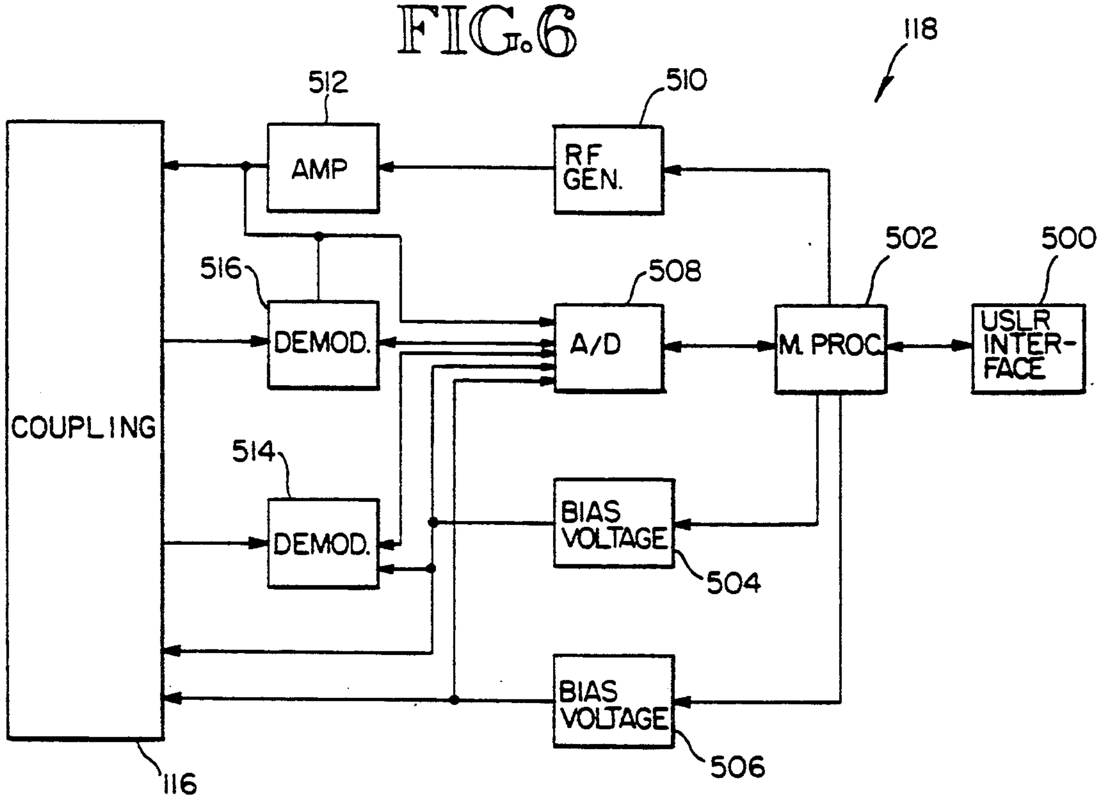
FIG. 6 is an illustrative block diagram of the data processing circuit of the mass spectrometer which comprisies the subject invention.

With reference to FIG. 6, a detailed illustrative block diagram of the data processor 118 is provided. As mentioned above, the data processor 118 is coupled to the housing 106 via an electromechanical coupling 116. The electromechanical coupling 116 includes, in addition to the vacuum couplings discussed above, electrical couplings for: providing the direct current voltages for the ion source 208 and the detector 216; providing the alternating current electrical signal for the mass filter 212; and for receiving the source signal and the detect signal from the ion source 208 and the detector 216, respectively. Suitable apparatus for the electrical couplings of the electromechanical couplings 116 are currently available to those skilled in the art. Accordingly, a suitable electromechanical coupling 116 may be readily provided by one skilled in the art.

The data processor 118 includes a user-interface 500 for interfacing a user with the mass spectrometer 100. The user interface 500 may comprise a cathode ray tube, keyboard, printer, and/or other devices for interfacing a user with the data processor 118. Alternatively, an application-specific user interface may be provided for receiving and transmitting specific input/output information. Either embodiment of the user interface 500 may be readily provided by one skilled in the art.

The user interface 500 is coupled to a microprocessor 502 for transmitting information signals therebetween. The microprocessor 502 comprises a digital processing circuit for processing digital information in accordance with a predetermined program. The microprocessor 502 may include random-access memory (RAM) for storing data and programming as is known in the art. Further, the mircoprocessor 502 may include read-only memory (ROM) for storing program data and program instructions for performing functions discussed herein. Still further, the microprocessor 502 may include other peripheral circuitry, such as latches, timers, oscillators, buffers, etc., necessary for constructing apparatus as discussed herein. The microprocessor circuitry 502 may be readily constructed from circuits that are readily available to those skilled in the art.

The microprocessor 502 is coupled to first and second bias voltage circuits 504 and 506, respectively. Each of the first and second bias voltage circuits is contructed for providing a plurality of substantially DC voltages in response to digital signals provided from the microprocessor 502. Conventional circuits for constructing the first and second bias voltage circuits 504 and 506 may include a digital-to-analog transducer in combination with a voltage amplifier. Other circuit combinations for constructing the first and second bias volage circuits may be readily provided by those skilled in the art.

The first bias voltage circuit 504 is constructed to provide the direct current voltage signals A, $B_1$, $B_2$, $B_3$, C and D to the ion source 208. The second bias supply 506 is constructed to provide the first, second, and third electrode signals F, G, and H for use by the detector 216. Each of these signals is provided to the electromechanical coupling 116 by the first and second bias voltage circuits 504 and 506. The first and second bias voltage circuits 504 and 506 may each comprise a plurality of digital-to-analog converters for converting the digital control signal received from the microprocessor 502 to a direct current voltage wherein the magnitude of the direct current voltage is determined by the value of the control signal. Voltage amplifiers and drivers may be provided for amplifying the direct current voltage and supplying the amplified voltage to the electromechanical coupling 116. Other suitable embodiments exist for the first and second bias voltage circuits 504 and 506.

In addition to being coupled to the interface 116, the substantially direct current voltage signals provided by the first and second bias voltage circuits 504 and 506 are coupled to an analog-to-digital transducer 508 for providing the DC voltages thereto. The analog-to-digital converter 508 is constructed to provide a plurality of digital signals to the microprocessor 502 indicative of the voltage magnitude of the voltages from the first and second bias voltage circuits 504 and 506. The microprocessor 502 is therefore capable of monitoring the voltage provided by the first and second bias voltage circuits 504 and 506 via the analog-to-digital convertor 508.

The microprocessor 502 is also coupled to a raido frequency generator 510 that is responsive to a digital signal provided from the microprocessor to provide the alternating current electrical signal V for use by the plurality of drift tubes 400-1 through 400-7 of the mass filter 212. The output from the RF generator 510 is amplified in a conventional radio frequency amplifier 512 before being provided to the electromechanical interface 116. The RF generator 510 may comprise any circuitry responsive to a digital input signal for providing a variable frequency output signal wherein the frequency of the output signal is a function of the binary value of the digital input signal. As an example, the RF generator 510 may comprise a frequency synhesizer comprised of a divide-by-N phase-locked loop, as is known in the art. Other suitable circuitry will readily become apparent to those skilled in the art. The output from the voltage amplifier 512 is provided to the analog-to-digtal convertor 508 so that the microprocessor 502 can monitor the frequency of the signal provided by the amplifier 512.

First and second synchronous demodulators 514 and 516 are coupled for receiving the source signal and detect signal, respectively, from the ion source 208 and the detector 216. From the above description it will be apparent to those skilled in the art that the detect signal will be modulated by the alternating current electrical signal V provided to the mass filter 212. The synchronous demodulator 516 is adapted to demodulate the frequency of the alternating current signal provided by the amplifier 512 from the detect signals to provide a substantially direct current output signal indicative of the magnitude of the dectect signal. In a presently preferred embodiment of the invention, the ion source 208 modulates the ion current by providing a variable magnitude signal A to the electron source 300. The modulated ion current results in greater sensitivity for the mass spectrometer. As a result of the modulation of the ion current, the source signal will likewise be modulated. Accordingly, the synchronous demodulator 514 is provided for receiving the variable magnitude signal A from the bias voltage circuit 504 and using this signal to demodulate the source signal received from the ion source 208 via the electromechanical coupling 116. The synchronous demodulators 514 and 516 may comprise conventional circuitry for demodulating a very high-frequency signal that has been modulated with another lower-frequency signal. Many suitable configurations for the synchronous demodulators 514 and 516 will readily become apparent to those skilled in the art.

The microprocessor 502 receives digital signals via the analog-to-digital convertor 508, the values of which are representative of the magnitudes of the source signal and detect signal. The microprocessor 502 is responsive to a stored program to compare the relative value of these signals and thereby determine the amount of the synchronous particle in the sample substance.

Although only several presently preferred embodiments of my novel invention have been described in detail herein, one skilled in the art will readily appreciate that various modifications of the above-described embodiments may be made without departing from the spirit and scope of the invention. Accordingly, the present invention is to be limited only by the following claims.

I claim:

1. A mass spectrometer for determining the quantity of a particular molecule in a substance to be evaluated wherein ions of the particular molecule have a predetermined molecular mass, said mass spectrometer comprising:

ion source means for receiving the substance to be evaluated and for ionizing molecules of the substance and providing an ion current of the molecules of the ionized substance as the ion source means output;

mass filter means for selectively increasing the energy level of the ions of said ion current to provide a maximum energy level to selected ions having the predetermined molecular mass, said mass filter means being constructed to periodically expose portions of said ion current to a predetermined maximum quantum of energy to substantially increase the velocity of the exposed ions of said ion current, the period of exposure being selected so that said selected ions having said predetermined molecular mass are repeatedly exposed to said predetermined maximum quantum of energy and thereby receive a maximum increase in velocity, said mass filter means including energy source means for providing energy to said ion current wherein the magnitude of energy provided varies between a predetermined minimum value and a predetermined maximum value and a plurality of channel means each having an interior channel for substantially isolating said channel from energy provided from said energy source means, each of said plurality of channel means further having a longitudinal axis and a predetermined channel length, said longitudinal axes of said plurality of said channel means being aligned so that said channels of said plurality of channel means defines an ion current path, said plurality of channel means being arranged along said ion current path in order of increasing channel length, said plurality of channel means being separated along said ion current path by a gap defining a plurality of field regions wherein the length of each said field region increases along said current path; and detector means responsive to said mass filter means for determining the quantity of selected ions that received said maximum increase in velocity thereby to determine the quantity of the particular molecule in the substance being evaluated.

2. The mass spectrometer as recited in claim 1 wherein said energy source means comprises conductive means responsive to said data processing means for providing an alternating current electrical signal to said plurality of channel means, said conductive means being constructed to provide opposite polarities of said alternating current electrical signal to alternating ones of said plurality of channel means along said ion current path so that substantially no electric field is provided to said channels of said plurality of channel means and so that an electric field having a predetermined maximum value is provided in said plurality of field regions, siad predetermined maximum value of said electric field corresponding to said predetermined maximum quantum of energy, said electric field being variable so that said predetermined maximum value of said electric field is periodically applied to alternating ones of said plurality of field regions whereby the frequency of said altenating current electrical signal is determinative of the period of application of said predetermined maximum value of said electric field.

3. The mass spectrometer as recited in claim 2 wherein each of said plurality of channel means comprises a plurality of spaced wafer, said plurality of spaced wafers being electrically conductive and being electrically connected, said channel length being determined by the number of said plurality of spaced wafers provided for each said channel means.

4. The mass spectrometer as recited in claim 2 wherein each of said plurality of channel means comprises an electrically conductive drift tube.

5. The mass spectrometer as recited in claim 2 wherein said ion source means further comprises means for providing a source signal indicative of the magnitude of said ion current that comprises the output of said ion source means.

6. The mass spectrometer as recited in claim 5 wherein said detector means further comprises:

ion detector means for decelerating the ion os said ion current after the selective acceleration thereof to determine a quantity of said selected ions that received said maximum increase in velocity, said detector means being further adapted to provide a detect signal indicative of the quantity of said selected ions detected; and data processing means responsive to said source signal and said detect signal for determining the quantity of the particular molecule in the substance being evaluated.

7. The mass spectrometer as recited in claim 6 wherein said data processing means further comprises a synchronous demodulator for demodulating said detect signal to remove any modulation provided thereto by the period of application of said electric field.

8. The mass spectrometer as recited in claim 6 wherein said data processing means comprises:

digital processing means for processing digital information in accordance with a predetermined program, said digital processing means being constructed and programmed to control the operation of said ion source means and said detector means, said digital processing means being further constructed and programmed to provide a digital frequency control signal the digital value of which is indicative of the desired frequency of said alternating current electrical signal; and alternating frequency generation means responsive to said frequency control signal for providing said alternating current electrical signal to said conductive means.

9. A mass spectrometer for determining the quantity of a particular molecule in a substance to be evaluated wherein ions of the particular molecule have a predetermined molecular mass, said mass spectrometer comprising:

ion source means for receiving a substance to be evaluated and for ionizing molecules of the substance to provide an ion current of the molecule of the ionized substance as the ion source means output and for providing a source signal indicative of the magnitude of said ion current that comprises the output of said ion source means;

mass filter means for selectively increasing the energy level of the ions of said ion current to provide a maximum energy level to selected ions having the predetermined molecular mass, said mass filter means being constructed to periodically expose portions of said ion current to a predetermined maximum quantum of energy to substantially increase the velocity of the exposed ions of said ion current, the period of exposure being selected so that said selected ions having said predetermined molecular mass are repeatedly exposed to said predetermined maximum quantum of energy and thereby receive a maximum increase in velocity;

ion detector means for decelerating the ions of said ion current after the selective acceleration thereof to determine a quantity of said selected ions that received said maximum increse in velocity, said detector means further provides a detection signal indicative of the quantity of said selected ions detected; and data processing means responsive to said source signal and said detect signal for determining the quantity of the particular molecule in the substance being evaluated.

10. The mass spectrometer as recited in claim 9 wherein said detector means comprises:

resistance means for providing a potential barrier to said ion current wherein the magnitude of said potential barrier is selected so that only said selected ions are permitted to pass therethrough; and transducer means for receiving said selected ions after passage through said resistance means and for providing said detect signal.

11. The mass spectrometer as recited in claim 10 wherein said resistance means comprises a uniform field-retarding potential detector responsive to a bias voltage provided by said data processing means, said bias voltage being equivalent to the energy acquired by said selected ionds that received said predetermined maximum energy level, said uniform field-retarding potential detectro being arranged to receive said ion current after traversing said ion current path and to expose said ion current to a retarding potential electric field so that only said sleected ions completely traverse said retarding potential detector and are provided as its output.

12. The mass spectrometer as recited in claim 11 wherein said data processing means comprises:

digital processing means for processing digital information in accordance with a predetermined program, said digital processing means being constructed and programmed to control the operation of said ion source means and said filter means, said digital processing means being further constructed and programmed to provide a digital bias control signal the digital value of which is indicative of the desired magnitude of said bias voltage;

bias supply means resposive to said digital bias control signal for providing said bias voltage; and means for transmitting said bias voltage to said uniform field retarding potential detector.

13. The mass spectrometer as recited in claim 10 wherein said transducer means comprises a Faraday cup constructed to receive the output of said resistance means and to provide said detect signal in response thereto.

14. The mass spectrometer as recited in claim 10 wherein said transducer means comprises a dynode constructed to receive the output of said resistance means and to provide said detect signal in response thereto.

15. The mass spectrometer as recited in claim 10 wherein said data processing means further comprises:

amplifier means for filtering and amplifying said detect signal, said amplifier means being further constructed for converting said detect signal into a substantially direct current voltage signal the voltage magnitude of which is proportional to the ion flux received by said transducer means; and conversion means for converting said voltage signal provided by said amplifier means into a digital signal the digital value of which is indicative of the magnitude of said voltage signal.

16. The mass spectrometer as recited in claim 9 wherein said ion source means further comprises means for modulating said ion current, said data processing means further comprising synchronous demodulation means resposive to the modulation frequency for demodulating said detect signal said data processing means being responsive to said source signal and said demodulated detect signal to determine the quantity of the particular molecules in the substance being evaluated.

17. The mass spectrometer as recited in claim 9 wherein said ion source means comprises:

ionization chamber means for receiving the substance to be evaluated and for ionizing molecules thereof;

ion extractor means for extracting ionizded molecules from said ionization chamber and for providing a predetermined energy level to the extracted ions to provide said ion current;

flow measurement means for intercepting a predetermined portion of the ions of said ion current to provide said source signal; and ion focusing means for focusing said ion current in a beam having a predetermined diameter and dispersion.

18. The mass spectrometer as recited in claim 17 wherein said data processing means comprises:

digital processing means for processing digital information in accordance with a predetermined program, said digital processing means being constructed and programmed to control the operation of said ion source means, said filter means and said detector means;

amplifier means for filtering and amplifying said source signal, said amplifier means being further constructed for converting said source signal into a substantially direct current voltage signal the voltage magnitude of which is proportional to the quantity of ions of said ions current; and conversion means for converting said voltage signal provided by said amplifier means into a digital signal the digital value of which is indicative of the magnitude of said voltage signal.

19. The mass spectrometer as recited in claim 9, further comprising:

housing means for providing vacuum isolation of said ion source means, said mass filter means and said dtector means from the ambient environment, said housing means including means for transmitting electrical signals to said data processing means and means for receiving electrical signals from said data processing means, said housing means further including means for receiving the substance to be evaluated; and vacuum means for creating and maintaining a vacuum within said housing means.

20. The mass spectrometer as recited in claim 19 wherein said vacuum means comprises:

input means for coupling the substance to be evaluated to said housing means, said input means including means for restricting the flow of the substance to be evaluated to thereby limit the amount of the substance provided to said housing means;

sorption pump means coupled to said housing for absorbing gas molecules in said housing to create a partial vacuum; and ion pump means for ionizing gas molecules in said housing and for attracting said ionized gas molecules to act as a pump to extract molecules from said housing and thereby increase the vacuum in said housing.

21. A method for determining the quantity of a particular molecule in a substance wherein ions of the particular molecule have a predetermined molecular mass, comprising the steps of:

(a) ionizing the molecules of the substance to provide an ion current having a predetermined energy level;

(b) providing a source signal indicative of the magnitude of the ion current that is selectively energized;

(c) selectively increasing the energy level of the ions of the ion current in a manner to provide maximum energy to selected ions having the predetermined molecular mass;

(d) providing an energy barrier to the ion current after the selective energization thereof, the energy level of the barrier being seolected so that only the selected ions that received the maximum level are enabled to transgress the barrier;

(e) detecting the amount of selected ions that transgress the energy barrier, the detected ions being identified as those that received the maximum energy level;

(f) providing a detect signal indicative of the amount of selective ions that have received the maximum energy level; and (g) compraing the source signal and the detect signal to determine the quantity of the particular molecule in the substance.

22. The method as recited in claim 21 wherein step (c), selectively increasing the energy level of the ions of the ion current, comprises the substep of:

(h) exposing portions of the ion current to a predetermined maximum force to accelerate the exposed ions of the ion current, the portions of the ion current which are exposed being chosen so that ions having the predetermined molecular mass receive the maximum increase in velocity.

23. The method as recited in claim 22 wherein step (e), exposing portions of the ion current to a predetermined maximum force comprises the substeps of:

(f) providing an electric field to preselected portions of an ion path traversed by the ion current, the electric field having a predetermined maximum value corresponding to the predetermined maximum force;

(g) isolating remaining portions of the ion path from substantially all electric fields; and (h) varying the frequency of the electric field in a manner so that the ions having the predetermined molecular mass are repeatedly exposed to the maximum value of said electric field.

24. The method as recited in claim 21 further comprising the steps of:

(i) modullating the magnitude of the ion current prior to selectively increasing the energy level of the ions of the ion current; and (j) demodulating the detect signal prior to comparing the detect signal with source signal thereby to increase the signal-to-noise ratio of the detect signal.

25. The method as recited in claim 21, further comprising the step of:

(k) performing steps (a) through (e) in a vacuum.

* * * * *

UNITED STATES PATENT AND TRADEMARK OFFICE

CERTIFICATE OF CORRECTION

PATENT NO. : 5,136,161 Page 1 of 2

DATED : August 4, 1992

INVENTOR(S) : Charles H. Logan

It is certified that error appears in the above-identified patent and that said Letters Patent is hereby corrected as shown below:

In column 16, claim 6, line 1, please delete "ion os" and substitute therefor -- ions of --.

In column 17, claim 11, line 15, please delete "ionds" and substitute therefor -- ions --.

In column 17, claim 11, line 17, please delete "detectro" and substitute therefor -- detector --.

In column 17, claim 16, line 65, please delete "reposive" and substitute therefor -- responsive --, and in line 66 please insert a comma after "signal".

In column 18, claim 17, line 7, please delete "ionizded" and substitute therefor -- ionized --.

In column 20, claim 24, line 20, please delete "modullating" and substitute therefor -- modulating --.

UNITED STATES PATENT AND TRADEMARK OFFICE

CERTIFICATE OF CORRECTION

PATENT NO. : 5,136,161
DATED : August 4, 1992
INVENTOR(S) : Charles H. Logan

It is certified that error appears in the above-indentified patent and that said Letters Patent is hereby corrected as shown below:

In column 20, claim 24, line 24, after "signal" please insert --the--.

Signed and Sealed this

Thirty-first Day of August, 1993

Attest:

Bruce Lehman

BRUCE LEHMAN

*Attesting Officer*

*Commissioner of Patents and Trademarks*